United States Patent [19]

Schwob et al.

[11] 4,354,272

[45] Oct. 12, 1982

[54] SOLID CRYSTAL LASER EMISSION DEVICE WITH AN IMPROVED EXTERNAL COOLING CIRCUIT

[75] Inventors: Hans-Peter Schwob, Uetendorf; Peter Soppelsa, Thierachern, both of Switzerland

[73] Assignee: Lasag S.A., Switzerland

[21] Appl. No.: 168,497

[22] Filed: Jul. 14, 1980

Related U.S. Application Data

[63] Continuation-in-part of Ser. No. 91,399, Nov. 6, 1979.

[30] Foreign Application Priority Data

Oct. 31, 1979 [CH] Switzerland ............... 9757/79

[51] Int. Cl.³ .................................... H01S 3/04
[52] U.S. Cl. ......................................... 372/36
[58] Field of Search ............... 331/94.5 P; 372/34, 372/36

[56] References Cited

U.S. PATENT DOCUMENTS

| | | | |
|---|---|---|---|
| 3,577,095 | 5/1971 | Benner | 331/94.5 P |
| 4,181,900 | 1/1980 | Tajnai et al. | 331/94.5 P |

Primary Examiner—William L. Sikes
Attorney, Agent, or Firm—Sherman & Shalloway

[57] ABSTRACT

A solid crystal laser emission device with an emission crystal and a gas discharge tube in a pumping cavity provided with a cooling circuit for cooling both emission crystal and discharge tube. The crystal and discharge cooling circuit is provided at least with a thermal conductor in contact with the crystal and with the discharge tube, each thermal conductor being further in contact with at least a dissipating wall of the pumping cavity. The crystal cooling circuit is provided with a set of three metal clamps having a longitudinal axis of symmetry perpendicular to the longitudinal axis of the crystal, the metal clamps encompassing the crystal approximately at its median zone and at each of its extremities.

6 Claims, 4 Drawing Figures

SOLID CRYSTAL LASER EMISSION DEVICE WITH AN IMPROVED EXTERNAL COOLING CIRCUIT

CROSS REFERENCE TO RELATED APPLICATION

This patent application is a continuation in part of our previous patent application, Ser. No. 91 399, filed Nov. 6, 1979.

BACKGROUND OF THE INVENTION

The above mentioned parent patent application disclosed a solid crystal laser emission device with an optical emission crystal and a gas-discharge tube in a pumping cavity, wherein the axis of longitudinal symmetry of the emission crystal, the optic axis of that crystal, and the axis of longitudinal symmetry of the discharge tube is approximately parallel. The crystal laser emission device is further provided with a cooling circuit for cooling both the emission crystal and the discharge tube. The crystal cooling circuit is provided at least with a thermal conductor in contact with the crystal and placed approximately in a plane perpendicular to the longitudinal axis of symmetry of the crystal. The discharge tube cooling circuit is also provided with a thermal conductor in contact with the body of the discharge tube. Each thermal conductor is maintained in contact with at least a dissipation wall of the pumping cavity.

SUMMARY OF THE INVENTION

In order to improve the dissipation of the heat release either by laser emission and ionization of the discharge tube and simultaneous obtaining a better bearing of the optic axis of the crystal in coincidence with a focal line of reflector in the pumping cavity, it has been found that a good solution is to provide the crystal cooling circuit with a set of three metal clamps, the metal clamps encompassing the crystal approximately in its median zone and in its extremities respectively.

This particular embodiment of our invention allows the crystal optic axis bearing in its extremities to be substantially free from mechanical vibrations.

DETAILED DESCRIPTION OF THE PREFERRED EMBODIMENTS

Figure 1:
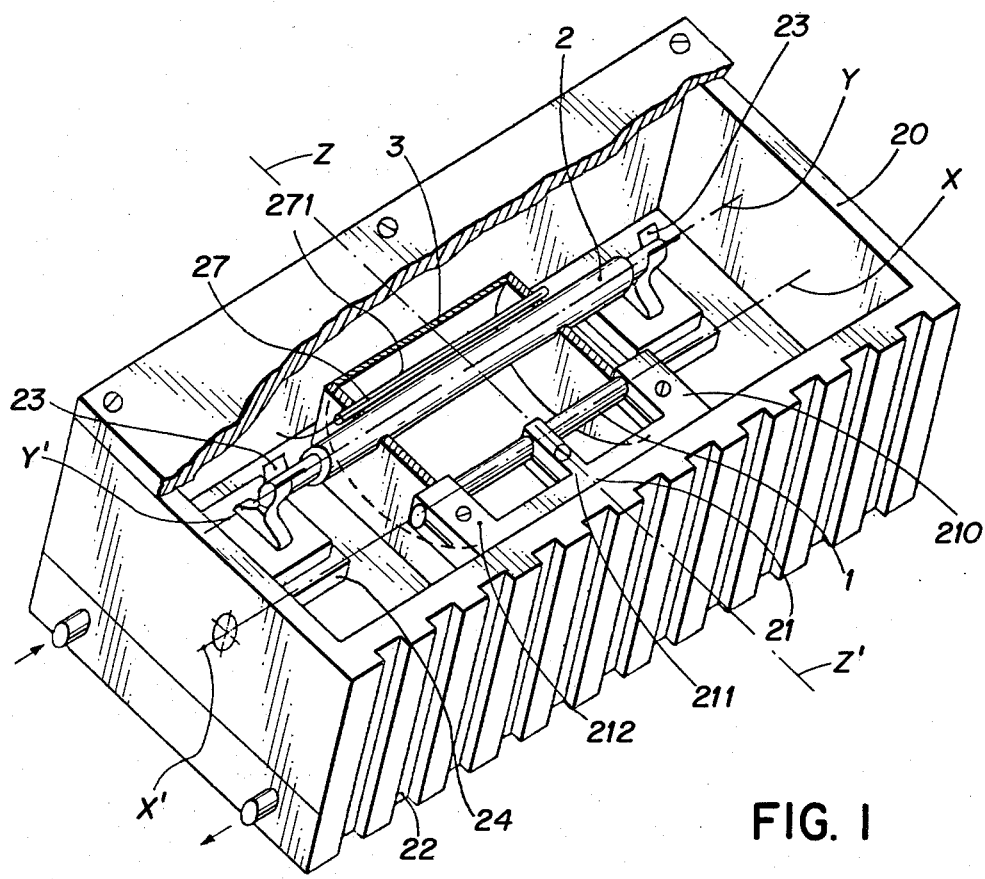
FIG. 1 represents in torn away perspective a complete laser emission device provided with a crystal cooling circuit according to the new embodiment of our invention.

According to FIG. 1, the solid crystal laser emission device comprises a pumping cavity 20. The pumping cavity 20 is provided with a reflector 3, an optical emission crystal 1 and a gas discharge tube 2 placed in the reflector 3. The reflector 3 may for example have an elliptic section. The pumping cavity can also simply comprise a layer of reflecting material on its inside walls. In FIG. 1 the pumping cavity is shown with the upper wall removed, thus making it possible to show the relative arrangement of the technical features embodying the laser emission device. Emission crystal 1 and discharge tube 2 are of revolution and respectively have an axis of longitudinal symmetry $x'x$ and $y'y$ in coincidence with a focal line $F_1 F'_1$, $F_2 F'_2$ of reflector 3. The axis of symmetry $x'x$ of the crystal coincide with the optic axis of this latter. In FIG. 1 reflector 3 of elliptic section is shown along a plane of section $x'x$ $y'y$.

The laser emission device according to the invention comprises a circuit for cooling the emission crystal 1 and discharge tube. The crystal cooling circuit is provided at least with a thermal conductor 21 in contact with crystal 1 and placed approximately in a plane perpendicular to longitudinal axis $x'x$ of the crystal.

The discharge tube cooling circuit is provided at least with a thermal conductor 23 in contact with the body of the discharge tube. Each thermal conductor is in contact with at least a dissipating wall 22 of the pumping cavity.

The cooling circuits are circuits of thermal conduction and are therefore not necessarily electrical circuits, although, in appropriate circumstance, electrical conduction may be desired.

According to the embodiment of our invention shown FIG. 1, the crystal cooling circuit comprises a set of three metal clamps 210, 211, 212, the set having a longitudinal axis of symmetry $z'z$ perpendicular to the longitudinal axis of the crystal. The metal clamps 211, 210, 212 the crystal 1 at its median zone and at its extremities respectively. The metal clamps have a size at their zone of contact with the crystal 1 less than or equal to 1/10 of the length of the crystal. The metal clamps are made of a metal whose thermal conductivity is greater than or equal to 0.694 W/cm°K. As an example they can be made of copper or copper alloys.

The metal clamps are mechanically solidly attached to a dissipating wall 22 of the pumping cavity. This makes it possible to assure holding of the crystal in its above mentioned position keeping its extremities free from mechanical vibrations.

The cooling circuit of discharge tube 2 comprises a metal clip 23 at each end of the discharge tube 2 making it possible the positioning of the discharge tube, its fastening and electrical feeding to power the discharge tube 2 at operating voltage. The electrical feed circuits powering the discharge tube are not shown in FIG. 1 so as not to impede the clarity of the latter. The discharge tube 2 is provided with a parallel ignition electrode 27 made up of a straight wire parallel to the axis of longitudinal symmetry of the discharge tube and insulated from the pumping cavity by an insulating tube 271. Each metal clip 23, a thermal conductor, is fastened to a dissipating wall of pumping cavity 20 by a support 24 of thermally conductive and electrically insulating material.

Figure 2:
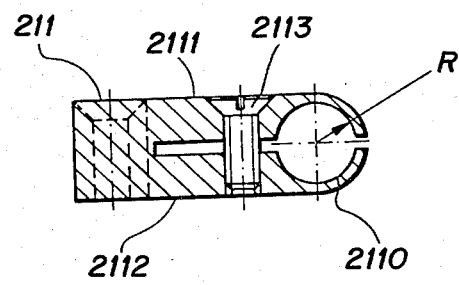
FIG. 2 represents in section a detail of one of the clamps according to the embodiment of FIG. 1.

According to FIG. 2, the metal clamps such as 210, 211, 212 are provided at their fastening end with two elementary shafts 2111, 2112 for clamp 211 in FIG. 2. The elementary shafts are joined together to form the body of the clamp through a resiliency. Resiliency is obtained by means of the resilient property of the metal the clamps are made of. The two elementary shafts are further provided with a housing 2110 for engaging the crystal 1 at an end of the resiliency. Housings 2110 from the zone of contact of the metal clamps with the crystal. In the example of FIG. 2 the elementary shafts are provided with a substantially U shaped housing. They can also be provided with a V shaped housing within the scope of our invention.

In FIG. 2, the U shaped housing curvature radius R is substantially the same as that of the crystal cross section. The elementary shafts are further provided with a tightening screw 2113 for bonding together the two elementary shafts. The tightening screw 2113 is located between the resiliency forming the body of the clamp and the housings.

The screw can be a precision screw which (taking into account the resiliency of the elementary shafts and the U shaped housing with curvature radius equal to that of crystal) gives a sharp control of the equal mechanical strength applied to the periphery of the crystal at the level of each zone of contact of the metal clamps with the crystal.

In FIG. 1, the two clamps 210, 212 which encompasses the crystal 1 at its extremities are located outside the reflector 3. Accordingly these two external clamps may have a width greater than the above mentioned 1/10 of the crystal length since they do not really cut off the light power entering the crystal.

Figure 3A:
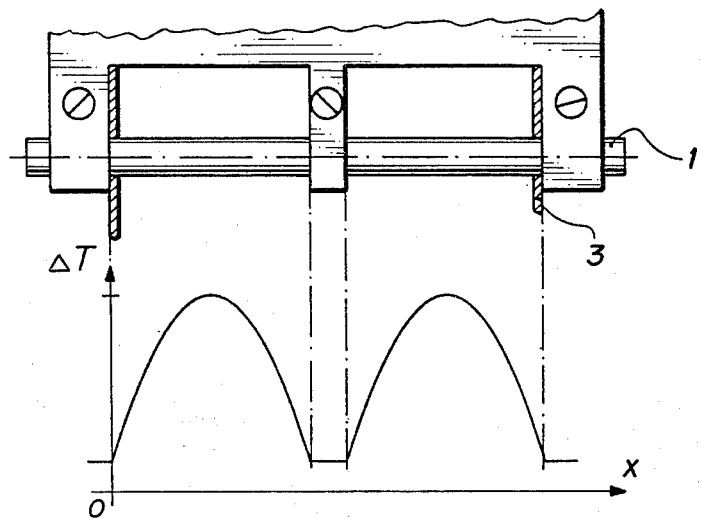
FIGS. 3a and 3b represent both a detail of the invention.
Figure 3B:
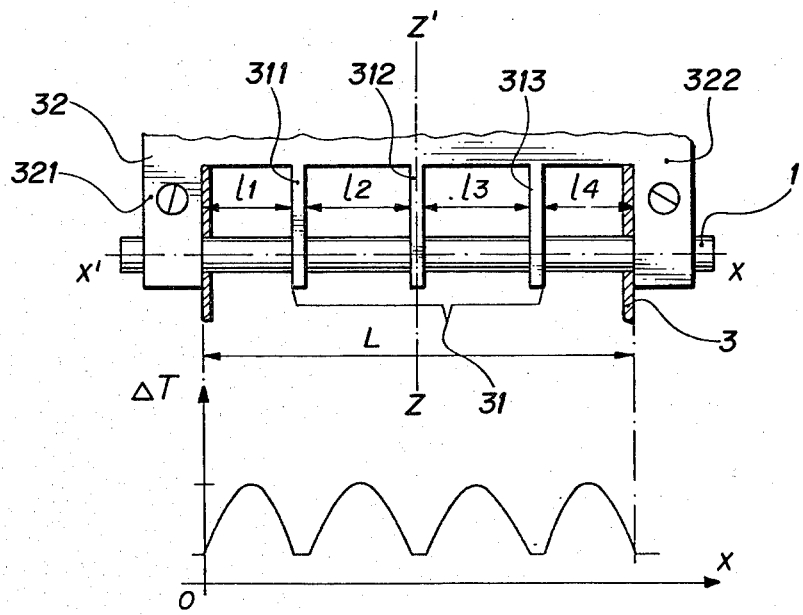

According to a preferred embodiment of our invention shown FIG. 3b, the crystal cooling circuit of the solid crystal laser emission device of our invention comprises a first set 31 of three metal clamps, the set having a longitudinal axis of symmetry z'z perpendicular to the longitudinal axis x'x of the crystal. The three metal clamps 311, 312, 313 encompass the crystal 1 approximately in its median zone and in predetermined zones such that the crystal length L located inside the reflector 3 is divided into four elementary $l_1, l_2, l_3, l_4$ parts of substantially equal length. As an example each clamp 311, 312, 313 may have a size at its zone of contact with the crystal less or equal to 1/30 of the crystal length. The metal clamps can be made of copper or copper alloys.

The crystal cooling circuit represented by FIG. 3b is also provided with a second set 32 of two metal clamps 321, 322 the set having an axis of symmetry substantially perpendicular to the longitudinal axis of the crystal. The metal clamps 321, 322 form the second set 32 of two metal clamps which are each located outside the reflector 3, each preferably being in contact with the external wall of the reflector. Each metal clamp 312, 322 encompasses the crystal approximately at its extremities.

Metal clamps 311, 312, 313 and 321, 322 or 210, 211, 212 do not need any tightening screw, the resiliency of each elementary shaft constituting these clamps being sufficient for supporting the crystal in its normal position. The crystal rod may be engaged, for example, in the housings of the clamps provided the elementary shafts constituting the clamps have been previously opened with a special tool, as for example, a blade inserted between the elementary shafts of each clamp. After positioning the crystal rod for substantially obtaining a symmetry of the arrangement with respect to the median zone of the crystal with clamp 312, the tool or tools can be removed and tightening screws when provided can be screwed so that crystal rod is securely maintained in its position.

The final position of the crystal rod in its support is represented FIG. 3b and corresponding temperature distribution of the crystal along its axis is also represented. The highest temperature elevation of the crystal rod between two consecutive clamps, substantially in the middle of two consecutive clamps, appears to be half of the corresponding temperature elevation when using the three clamped crystal rods represented FIG. 3a.

A mean radiating power of 2 W has been obtained in operation for a pulsed lasing Nd-Yag crystal rod of diameter ¼" and 3 inches long.

We claim:

1. A solid crystal laser emission device comprising in a pumping cavity, an optical emission crystal and a gas discharge tube parallel with axes of symmetry, a cooling circuit for cooling the emission crystal and a cooling circuit for the gas discharge tube, wherein the crystal cooling circuit comprises at least a thermal conductor in contact with the crystal and placed approximately in a plane perpendicular to the longitudinal axis of symmetry of the crystal, the discharge tube cooling circuit comprises at least a thermal conductor in contact with the body of said discharge tube, each thermal conductor further being in contact with at least a dissipating wall of said pumping cavity, said crystal cooling circuit substantially comprising a set of three metal clamps having a longitudinal axis of symmetry perpendicular to the longitudinal axis of the crystal, the metal clamps encompassing said crystal approximately in its median zone and in its extremities respectively.

2. A solid crystal laser emission device according to claim 1 wherein said metal clamps have a size at their zone of contact with the crystal less than or equal to 1/10 of the length of said crystal.

3. A solid crystal laser emission device according to claim 2, wherein said metal clamps are made of a metal whose thermal conductivity is greater than or equal to 0.694 W/cm°K.

4. A solid crystal laser emission device according to claims 1 or 2 wherein the metal clamps are provided at their fastening ends with two elementary shafts, the elementary shafts being joined together to form through a resiliency the body of the clamp, the two elementary shafts being provided with a housing at the opposite end of the resiliency where the crystal is engaged.

5. A solid crystal laser emission device according to claim 4, wherein said elementary shafts are provided with substantially U shaped housing whose curvature radius is substantially the same as the curvature radius of the crystal cross section, said elementary shafts being further provided with a tightening screw.

6. A solid crystal laser emission device comprising in a pumping cavity, an emission crystal and a gas-discharge tube with parallel axes of symmetry, a circuit for cooling the emission crystal and discharge tube, wherein the crystal cooling circuit comprises at least a thermal conductor in contact with the crystal and placed approximately in a plane perpendicular to the longitudinal axis of symmetry of the crystal, the discharge tube cooling circuit comprising at least a thermal conductor in contact with the body of said discharge tube, each thermal conductor further being in contact with at least a dissipation wall of the pumping cavity, said crystal cooling circuit substantially comprising:

a first set of three metal clamps having a longitudinal axis of symmetry perpendicular to the longitudinal axis of the crystal, the metal clamps encompassing the crystal approximately in its median zone and in predetermined zones thereby dividing the length of said crystal located inside said reflector into elementary parts of equal length, a second set of two metal clamps having a longitudinal axis of symmetry perpendicular to the longitudinal axis of the crystal, said metal clamps located outside said reflector encompassing said crystal approximately in its extremities respectively, the first and second set of metal clamps thereby allowing the temperature distribution of the crystal along its longitudinal axis to be substantially symmetrical with respect in said median zone of the crystal.

* * * * *